(No Model.)

J. F. HOLMES & J. P. TOMPKINS.
FRICTION CLUTCH.

No. 448,921. Patented Mar. 24, 1891.

Witnesses:
E. P. Ellis
J. M. Nesbit

Inventors.
J. F. Holmes
J. P. Tompkins
per Lehmann & Pattison, attys.

UNITED STATES PATENT OFFICE.

JOHN FORD HOLMES AND JEROME PRESTON TOMPKINS, OF WATERFORD, NEW YORK.

FRICTION-CLUTCH.

SPECIFICATION forming part of Letters Patent No. 448,921, dated March 24, 1891.

Application filed December 9, 1890. Serial No. 374,047. (No model.)

*To all whom it may concern:*

Be it known that we, JOHN FORD HOLMES and JEROME PRESTON TOMPKINS, of Waterford, in the county of Saratoga and State of New York, have invented certain new and useful Improvements in Friction-Clutches; and we do hereby declare the following to be a full, clear, and exact description of the invention, such as will enable others skilled in the art to which it pertains to make and use it, reference being had to the accompanying drawings, which form part of this specification.

Our invention relates to an improvement in friction-clutches; and it consists in certain novel features of construction, which will be fully described hereinafter.

The object of our invention is to provide a friction-clutch by means of which a shaft can be gradually started or stopped at the will of the operator, and which is cheap, simple, and not liable to get out of order while in operation.

Figure 1:
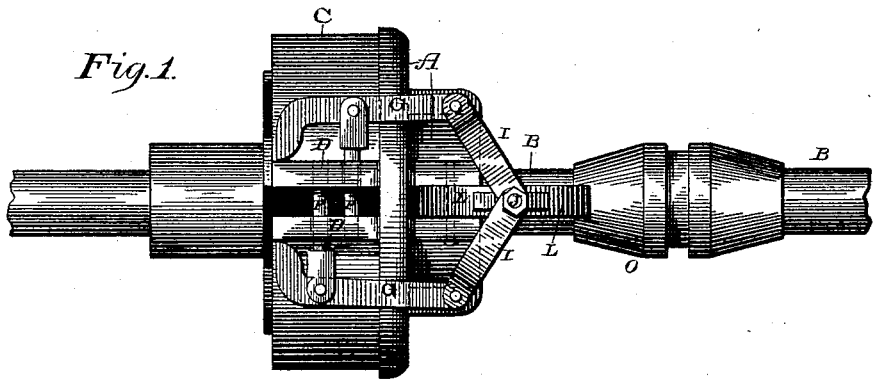
Figure 2:
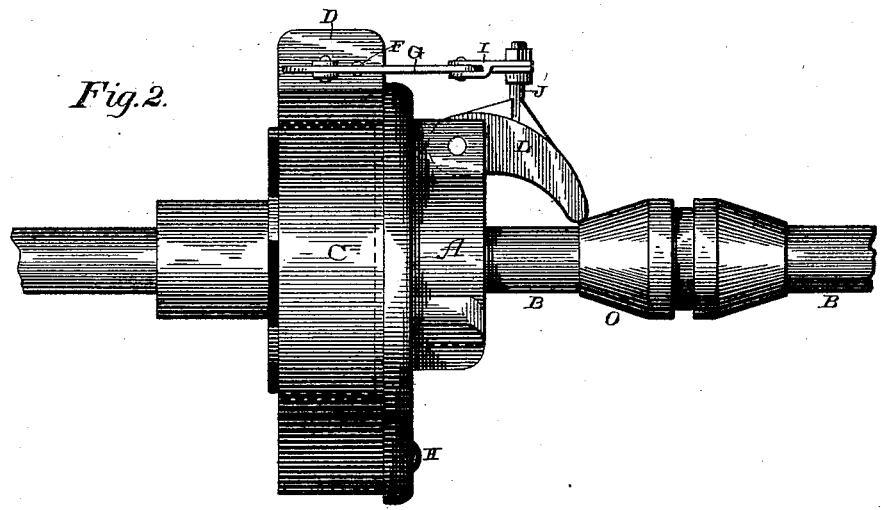
Figure 3:
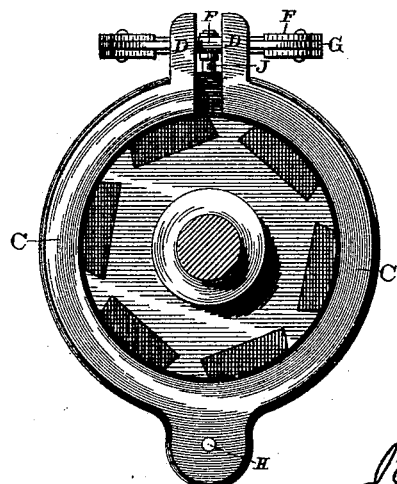

Figures 1 and 2 are side elevations of a clutch which embodies our invention. Fig. 3 is an end view.

A represents the hub which is rigidly secured to one end of the shaft B, so as to revolve therewith. Pivoted upon this hub A is the split ring C, which may be made of either one, two, or more parts, and which has flanges D formed upon each of its ends. Through these flanges are passed the connecting-bolts F, one end of each being secured to one flange D and passing loosely through the other one. If the ring is made in two parts, there will be four of these flanges D and four of the connecting-bolts F; but if the ring is made of only one part, then there will be but two flanges and two connecting-bolts F. Springs may be placed between the ends of the ring or not, as may be preferred, for the purpose of forcing the ends of the ring apart when it is desired to stop the revolution of the shaft.

The outer ends of the bolts F are forked, and pivoted in these forked ends are the levers G, which have cams formed upon their lower ends for the purpose of bearing against the outer sides of the flanges D.

It will be readily understood that the ring C may be made of two separate parts, without departing from the spirit of my invention, instead of one part. When the ring is made of two separate parts, another arrangement, like the one shown at the open portion of the ring, will be used for closing the ring at the other side, and the bolts H will pass through slots formed in opposite edges of the hub.

The pressure of the cams upon the lower ends of the levers G, whether the ring is made of one or two parts, serves to contract the ring to any desired extent. To the outer ends of the levers G are fastened the connecting-links I, which form toggle-joints, and which links are pivoted at their inner ends upon the rods J, which extend outward from the pivoted lever L, which is pivoted upon the hub. The outer end of this lever L catches in the groove in the sliding collar O, and thus serves to hold the collar in its inward position and thus hold the parts in a locked position in relation to the pulley, which is moved by a lever of any suitable construction. This sliding collar is placed upon either the hub or directly upon the shaft B, as may be desired. When this collar is moved endwise, the lever L is made to turn upon its pivot and through the links I operate the levers L and through these levers open or close the ring.

The pulley which fits inside of the ring may be made of bronze, carbonized fiber, or any other material that may be preferred.

A clutch constructed as above described gives the workman almost absolute control over the movements of his machinery by enabling him to stop or start it instantly, thus adding greatly to the delicacy and efficiency of the work in hand. The arrangement of the flanges, the connecting-bolts, and the cam-levers enables great power to be applied so as to close the ring upon the pulley with any unusual amount of force desired.

Having thus described our invention, we claim—

1. In a clutch, a split ring provided with flanges, levers pivotally connected between their ends to the two parts of the ring, respectively, and having one of their ends engaging the said flanges, and a sliding collar for operating the opposite ends of the said levers, substantially as specified.

2. In a clutch, a split ring provided with flanges, connecting-bolts, levers pivoted between their ends in the ends of the bolts and each of said levers having one end engaging the said flanges, and a sliding collar which operates the opposite ends of the levers, for the purpose described.

3. The combination of the hub, the split ring provided with flanges, the connecting-bolts, levers provided with cams upon their ends, a sliding collar, and a toggle-joint connection between the collar and the levers, substantially as set forth.

4. In a clutch, a hub, a split ring having flanges, levers pivoted between their ends and having one end engaging the said flanges, a lever L, pivoted upon the hub, links connecting the lever L and the adjacent ends of the said levers, and a sliding collar which operates the lever L, substantially as set forth.

In testimony whereof we affix our signatures in presence of two witnesses.

JOHN FORD HOLMES.
JEROME PRESTON TOMPKINS.

Witnesses:
THOMAS MULHERN,
GEORGE H. COLE.